United States Patent Office 3,557,616
Patented Jan. 26, 1971

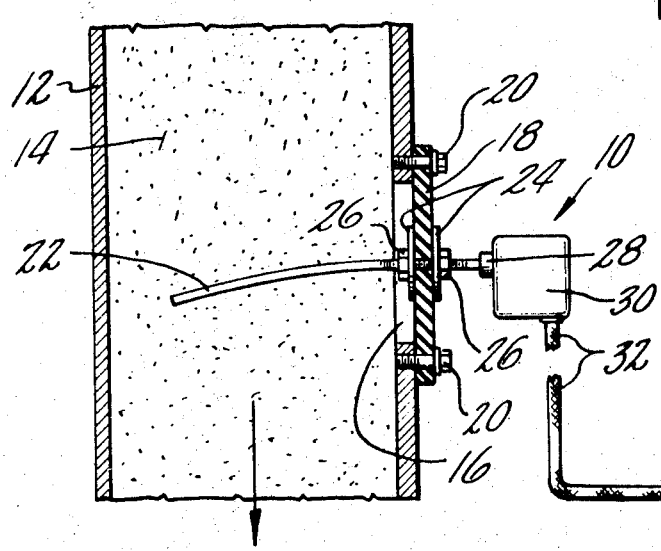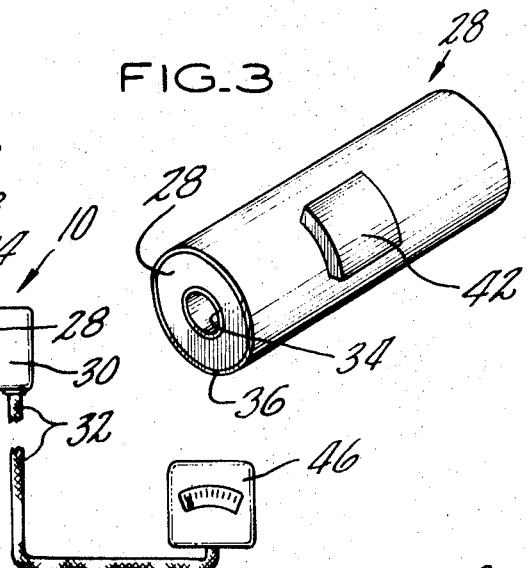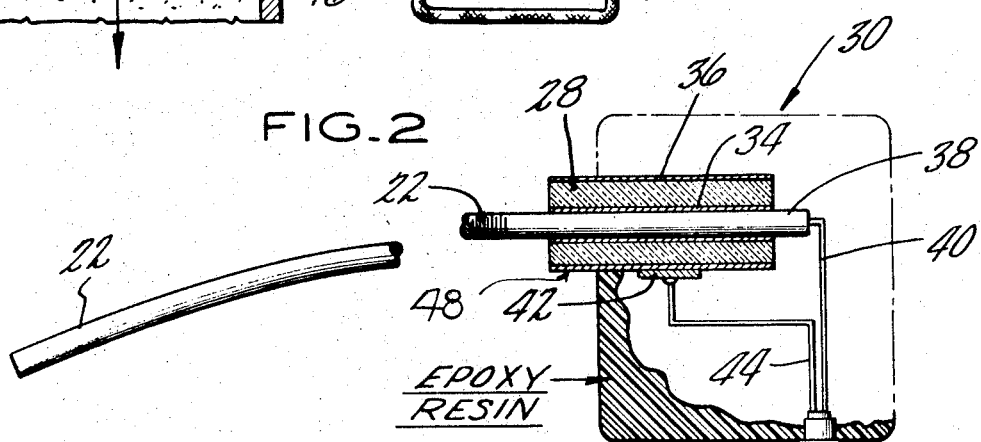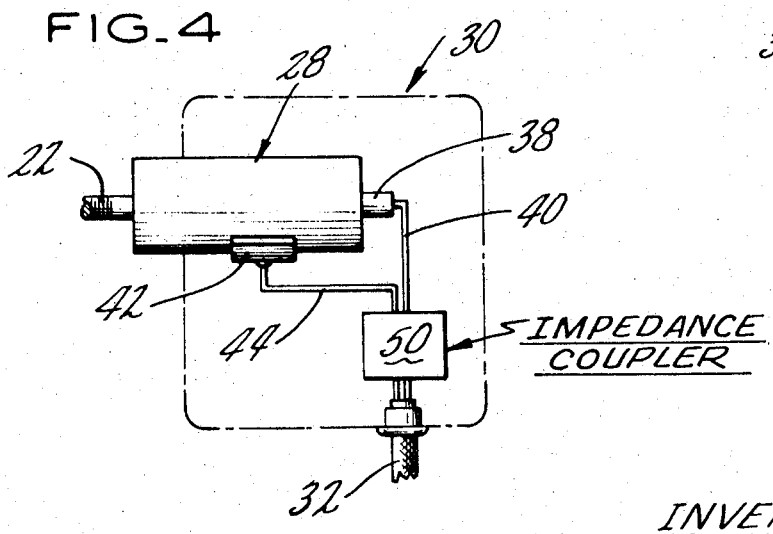
INVENTORS
WILLIAM W. LANDON, JR.
ROBERT W. KULIK

3,557,616
PARTICLE FLOW SENSING DEVICE
William W. Landon, Jr., Hebron, and Robert W. Kulik, East Granby, Conn., assignors to Combustion Engineering, Inc., Windsor, Conn., a corporation of Delaware
Filed Sept. 29, 1967, Ser. No. 671,728
Int. Cl. G01p 5/02
U.S. Cl. 73—228                                2 Claims

ABSTRACT OF THE DISCLOSURE

A flow sensing device comprising a piezoelectric means supported upon and activated by an elongated member placed in the flow path of a particle-entrained flow, the piezoelectric means being a radially stressed ceramic piezoelectric crystal of cylindrical configuration producing an electrical signal in response to the impact of the particles on the elongated member.

BACKGROUND OF THE INVENTION

The field with which this invention is concerned relates to means for sensing particle flow in an enclosed transport conduit. It is often necessary when transporting particles in a closed conduit that an operator at some remote point be able to determine when there is a flow stoppage. For example, when transferring coal from a hopper to a pulverizing mill, sometimes the coal gets "hung-up" and ceases to flow. When this occurs, conditions in the pulverizing mill and in the remainder of the related system must be controlled accordingly. Similar problems may arise when transporting other granulated flows such as grain or bark. Therefore, it is necessary to have a simple, efficient alarm or warning means available to indicate particle flow stoppage in systems of this nature.

One such warning system uses an elongated member to intercept, and be activated by, particles in the flow. The particles striking this elongated member produce vibrations which are picked up by a very sensitive microphone attached to the member. The microphone in turn relays the picked-up signal to an amplifier or readout device whereby it can be determined whether flow exists by a positive output signal or when flow ceases by no signal being emitted. This system is shown by the prior art U.S. patents of either Bogot et al. (Pat. No. 2,659,881) or Greacen III et al. (Patent No. 2,698,929). These devices show elongated members placed in the particle flow path and, when struck by particles, activating microphones to give an indication of the particle flow. These devices, however, are fragile and expensive and are difficult to replace after installation if problems with them arise.

Another method of sensing particle flow has been to use a piezoelectric means in place of the microphone in the device as discusses immediately above. Waters et al. (Pat. No. 2,561,763) show an elongated member being struck by particles of flow and activating a piezoelectric means. The nature of a piezoelectric means is to generate an electric signal upon mechanical compression. This signal can then be taken off of the means and used to activate any suitable readout device. The piezoelectric means of Waters et al. is shown as housed in a highly resilient mounting and securely mounted to the flow tube to prevent extraneous vibrations from affecting the reading. This arrangement is also fragile and expensive and has not come into popular use.

SUMMARY OF THE INVENTION

Our invention is to provide a very simple and inexpensive piezoelectric means for sensing particle flow. An elongated member is resiliently mounted in the side of a conduit in which the particle flow is to be sensed. This elongated member is adapted to be struck by the particles flowing in this conduit. On the opposite end of the elongated member is mounted a piezoelectric means which is enveloped in an elastic protective casing. Electrical leads from the piezoelectric means can then be directed to an appropriate readout device, remote from the area of the conduit in which the flow is sensed, to activate any suitable alarm means. In addition, an impedance coupling device can be placed in the leads from the piezoelectric means and included in the elastic protective casing. The purpose of this impedance coupling device is to reduce any noise pick-up in the leads between the piezoelectric means and the readout device which might interfere with the output signal of the piezoelectric means.

Thus we have obtained a very simple and economical means of sensing particle flow in a conduit. The piezoelectric means need not be supported by anything other than the elongated sensing member. The device is entirely protected by the elastic protective casing and thus requires no additional structure to support or protect it. If problems arise with a particular means, it may be easily and economically replaced with a minimum loss of time and inconvenience.

BRIEF DESCRIPTION OF THE DRAWINGS

FIG. 1 is a representation, partly in section and partly diagrammatic, of a conduit carrying a flow to be sensed and the flow sensing device of this invention;

FIG. 2 is an enlarged view, partly in section, of the flow sensing device with various parts removed for simplicity;

FIG. 3 is a perspective view of the piezoelectric means; and

FIG. 4 is an enlarged fragmentary view, partly in section, of a modification of the sensing device as shown in FIG. 2 incorporating an impedance coupler.

DESCRIPTION OF THE PREFERRED EMBODIMENTS

Referring to the drawings wherein like reference characters are used throughout to designate like elements, the illustrative embodiment of FIG. 1 shows the particle flow sensing device 10 of this invention mounted on a flow transporting conduit 12. Conduit 12 serves as a passageway for particle flow 14 which may be either coal, grain, or the like. The sensing device is mounted through an opening 16 in the side of conduit 12. A resilient gum rubber mounting 18 is secured to the wall of conduit 12 by bolts 20. An elongated member 22 passes through a central opening in the mounting 18 and is secured thereto by metal washers 24 and bolts 26. Member 22 is a solid rod and may be made of metal or of any stiff material such as nylon or rubber. The member may have a slightly bent shape in the direction of the flow so that any large foreign-matter in the flow will not stick thereto.

On the opposite end of member 22 is mounted the flow sensing device 10. As best seen in FIG. 2, the flow sensing device 10 comprises a piezoelectric means 28 surrounding one end of member 22, the member protruding completely through the piezoelectric means and exiting therefrom as at portion 38. The piezoelectric means is shown as a cylindrical crystal but may take any other convenient form. Such crystals are standard in the industry and come in many shapes and sizes; however, we have found that a radially stressed ceramic piezoelectric crystal of cylindrical configuration with an outside diameter of ½ inch, an inside diameter of ¼ inch, and a length of ½ inch provides an excellent output signal.

The piezoelectric means 28 itself, as best seen in FIG. 3, has a coating on both the inner surface 34 and the outer surface 36, the coating being of an electric conducting material such as silver. Action of member 22, as explained herein below, will minutely compress the piezoelectric crystal 28 causing the crystal to generate an electric signal between the surfaces 34 and 36. This is, of course, the natural function upon deformation of a piezoelectric crystal. The signal generated is picked up by leads 40 and 44 which are conductively connected to the conducting surfaces 34 and 36. If member 22 is made of a conducting material such as metal, as shown, it will provide the necessary contact with the inside electric conducting surface 34 of the piezoelectric means 28 and conductor 40 may be attached thereto. If member 22 is of a nonconducting material, it may then be terminated within the means 28 and a conductive plug inserted in the end thereof to which conductor 40 may be attached. The outside conducting surface is provided with any suitable conductive means, such as a metal shim 42, to which conductor 44 is connected. Conductors 40 and 44 are then joined in coaxial cable 32, the cable being directed to a remote readout device 46 of any convenient type to serve as an alarm means. Coaxial cable is, of course, used to shield an electrical signal from extraneous interference.

The piezoelectric means 28 and the portion of elongated member 22 upon which it is mounted, the conductors 40 and 44 and the end of coaxial cable 32 to which they are connected are all enveloped in an elastic protective casing means 30. Simply molding these elements in a block of epoxy resin has been found to be an efficient, inexpensive, and a conveniently manufacturable protective means. It is, of course, understood that any suitable elastic means may be used. We have found that by allowing a portion 48 of the piezoelectric means 28 to protrude from the elastic casing 30, the elastic casing will be prevented from attenuating the vibration of the elongated member 22 before it enters the crystal 28, and thus minimize any interference with the movement to be transferred from member 22 to the piezoelectric crystal.

Since piezoelectric crystals are normally of high impedance, we have found that the inclusion of an impedance coupler 50, as shown in FIG. 4, will reduce any noise that might tend to interfere with the signal to be read. Any "high impedance" to "low impedance" coupler may be used. Since a particular coupler circuitry does not form part of our invention and such couplers are well known in the art, a description thereof is not presented herein. The impedance coupler 50 is located in the leads 40, 44, and is ideally included within the elastic protective casing 30.

With the device thus described, the operation is as follows: Particles 14 flowing in conduit 12 strike the member 22. The impinging of these particles on the member exerts a downward force on the member. Due to the inertia of the piezoelectric means 28 and its elastic protective casing 30, movement of member 22 causes a minute compressive force to be developed between the inner surface 34 of the piezoelectric crystal and the outer surface 36. This compressive force generates an electrically signal, according to the nature of piezoelectric means, which is transmitted through the conductors 40 and 44 and thus through coaxial cable 32 to the readout device 46.

When flow ceases, member 22 will not have anything acting thereupon and accordingly will not activate means 28. Thus the output signal will cease. The cessation of the signal will immediately show up on the readout device 46. In this manner one becomes aware of a stoppage in the flow in conduit 12 and any adjustments to the system resulting from flow stoppage may be accomplished.

We are thus able to create an inertial force actuated alarm device due to the structural arrangement of having the member 22 solely supported by the resilient gum rubber mounting 18 and having the piezoelectric means in turn solely mounted on member 22. This novel arrangement is made possible by the rugged and unique elastic protective casing for the piezoelectric means and its related structure. The result is a practical and inexpensive flow sensing alarm easily installable and not subject to the physical and economic drawbacks of the present existing devices.

While we have illustrated and described preferred embodiments of our invention, it is to be understood that such are merely illustrative and not restrictive and that variations and modifications may be made therein without departing from the spirit and scope of the invention. We therefore do not wish to be limited to the precise details set forth but desire to avail ourselves of such changes as fall within the purview of our invention.

We claim:

1. A particle flow sensing device comprising a rod resiliently supported to intersect a particle flow path, a radially stressed ceramic piezoelectric crystal of cylindrical configuration for generating an electrical signal, said piezoelectric crystal mounted on and solely supported by said rod whereby particles impinging upon said rod will actuate said piezoelectric crystal to generate said electrical signal, and means operatively connected to said piezoelectric crystal to carry said generated signal to a sendout means, and wherein at least a major portion of said piezoelectric crystal, the portion of said rod supporting said major portion of said piezoelectric crystal and a connecting portion of said signal carrying means are enveloped in an elastic protective casing means.

2. A particle flow sensing device as defined in claim 1 further including an impedance coupler, said coupler being located within said portion of said signal carrying means whereby said impedance coupler will be enveloped in said elastic protective casing means.

References Cited

UNITED STATES PATENTS

| 2,561,763 | 7/1951 | Water et al. | 73—228 |
| 2,659,881 | 11/1953 | Bogot et al. | 340—239 |
| 2,955,216 | 10/1960 | Dieter | 310—9.4 |

RICHARD C. QUEISSER, Primary Examiner

J. K. LUNSFORD, Assistant Examiner

U.S. Cl. X.R.

340—239